March 17, 1931.   A. K. PETERSON   1,796,765
AIRCRAFT
Filed Dec. 17, 1928   2 Sheets-Sheet 2
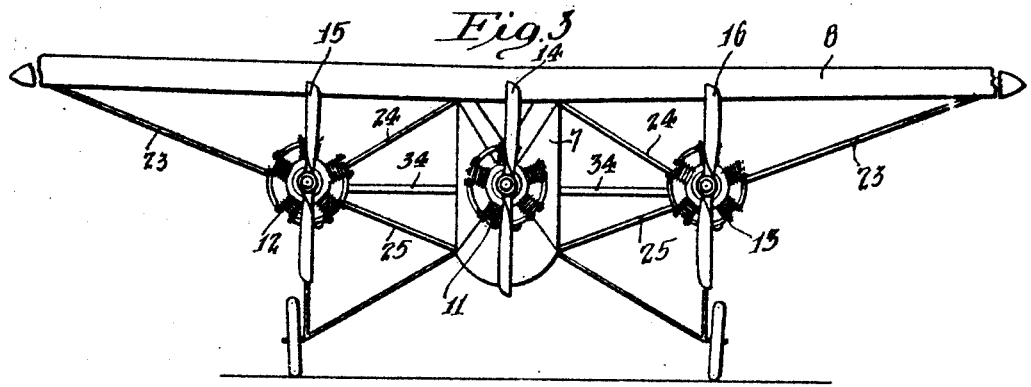
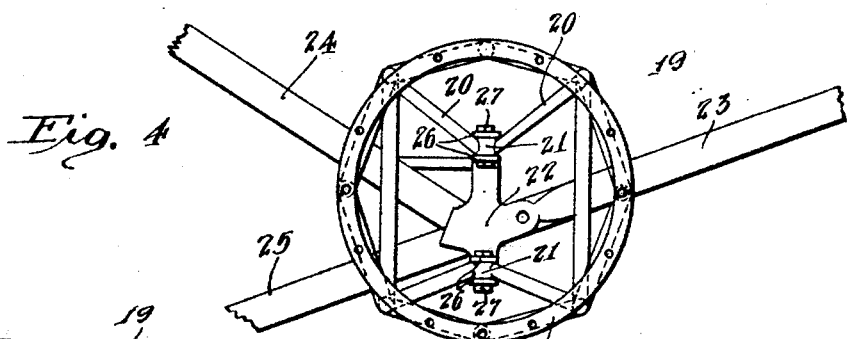
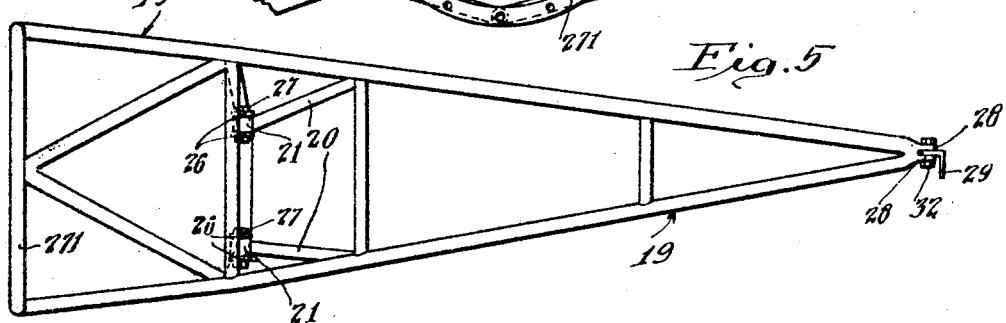
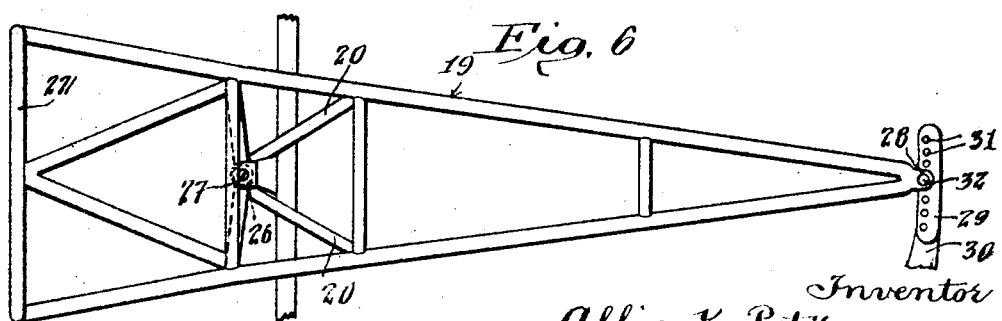
Inventor
Albin K. Peterson
By Lyon & Lyon
Attorney Patented Mar. 17, 1931

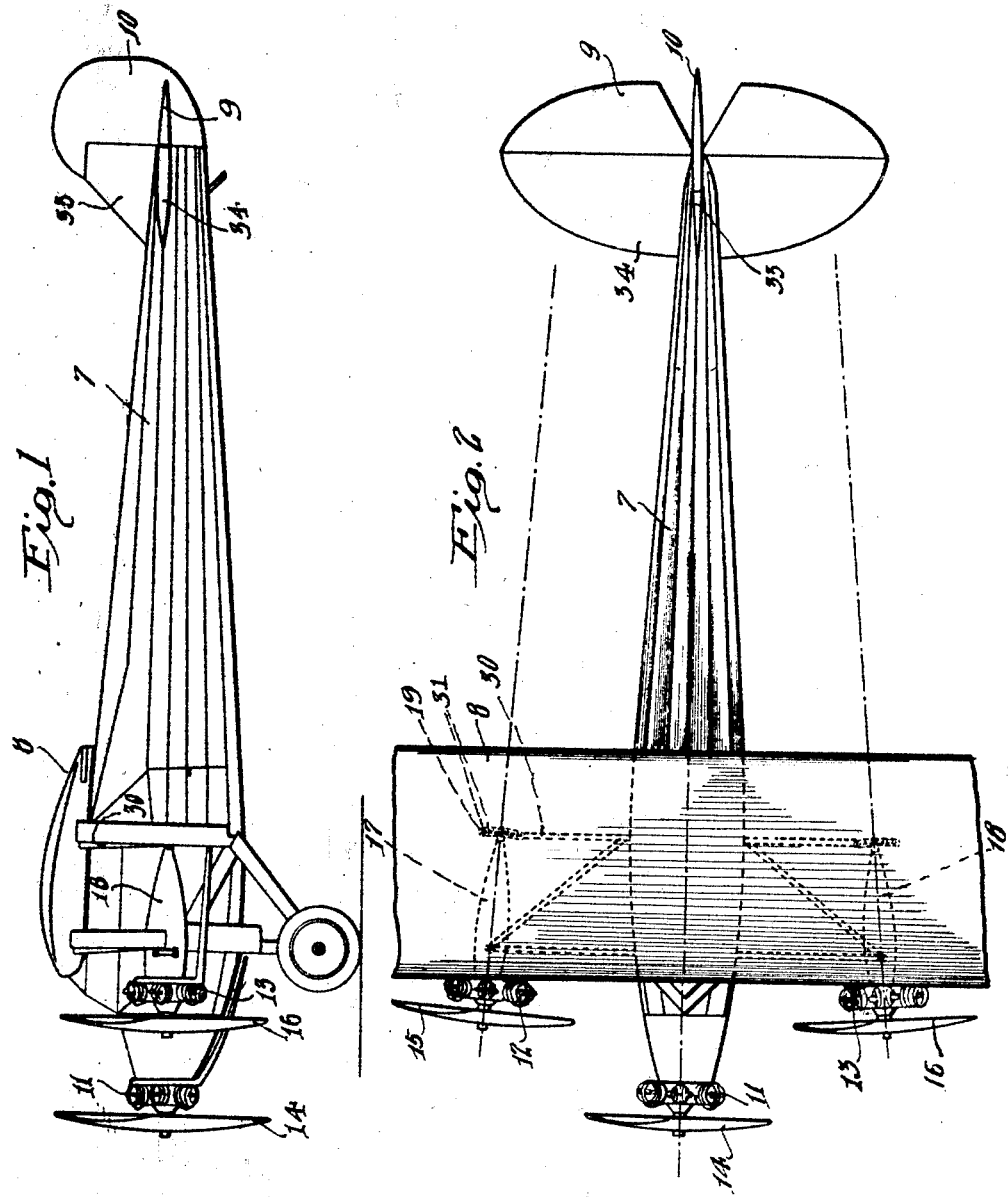

1,796,765

UNITED STATES PATENT OFFICE

ALBIN K. PETERSON, OF LOS ANGELES, CALIFORNIA, ASSIGNOR, BY MESNE ASSIGNMENTS, TO JOSEPH KREUTZER CORPORATION, OF LOS ANGELES, CALIFORNIA, A CORPORATION OF NEVADA

AIRCRAFT

Application filed December 17, 1928. Serial No. 326,524.

This invention relates to motor powered aircrafts and one of the important objects of the invention is to increase the stability of plural motored aircraft.

When motors are mounted in the well known manner on opposite sides of the longitudinal axis of an airplane, if one of the motors should stop, or be stopped, for any reason, whatever inherent stability the airplane has when the motors on opposite sides are operating, is detrimentally affected, since the propeller operating on one side tends to turn the aircraft in a circle and, to avoid this tendency, it is necessary to set the rudder at such an angle that the rudder will tend to turn the airplane in another circle opposed to the first mentioned circle. Not only is there considerable loss of power from this procedure, but every little variation of air pressure on the airfoils of the airplane produces a decided variation in the line of flight and, accordingly, the flight is quite jumpy or uneven and, more or less, dangerous.

An important object of the present invention is to so mount the outboard motors, that is to say the motors on either side of the longitudinal axis of the aircraft, at an angle to the longitudinal axis of the aircraft, or so that they may be turned at an angle, in order that the slipstream of the propellers driven by said motors will be directed rearwardly and inwardly toward the opposite sides of the fuselage and toward the opposite sides of the rudder airfoil and vertical fin. Thus, if one of the outboard motors should stop or be stopped, the other outboard motor will drive the slipstream from its propeller against one side of the fuselage and against one side of the rudder and vertical fin so as to counteract the tendency to turning of the airplane in a circle. The angular position of the operating outboard motor also entails that its propeller axis is directed forwardly away from the side about which the aircraft would naturally tend to turn when the other outboard motor is not operating, thus tending to pull the nose of the aircraft in a direction opposite to that in which it would drift, if the turning axis of the propeller were parallel to the longitudinal axis of the aircraft.

It will be readily understood that the invention may be embodied in aircraft provided with two or more propellers, of which at least two are positioned on opposite sides of the longitudinal axis of the aircraft.

Another important object is to mount the motors and their propellers so that the path of rotation of the propeller blade tips will be substantially below the upper or vacuum face of the wing airfoils. I term the upper face of the wing airfoil "vacuum" face because of the well known fact that a partial vacuum or lowered pressure is created above the wing as compared with the pressure below said wing. By insuring that the slipstream of the propellers flows rearwardly beneath the wing airfoil, the partial vacuum created above said airfoil is not disturbed or reduced in degree by the presence of air currents created by the propellers.

Other objects and advantages will appear in the subjoined detailed description.

The accompanying drawings illustrate the invention.

Fig. 1 is a side elevation of an aircraft constructed in accordance with the provisions of this invention.

Fig. 2 is a plan view of Fig. 1, end portions of the wing airfoil being broken away.

Fig. 3 is an elevation of Fig. 2 from the left thereof.

Fig. 4 is an enlarged detail view of one of the nacelle frames and its pivotal mounting.

Fig. 5 is a side elevation of one of the pivotally mounted nacelle frames.

Fig. 6 is a plan view of Fig. 5.

Referring to the drawings, the aircraft comprises a fuselage 7, a wing airfoil 8 connected with the fuselage, an elevator airfoil 9, a vertical fin 33, a horizontal fin 34, and a rudder airfoil 10. In the present instance the aircraft is tri-motored, the nose motor being indicated at 11 in the longitudinal axis of the aircraft. Outboard motors are indicated at 12, 13, on opposite sides of the longitudinal axis of the aircraft. The motors 11, 12, 13 operate, respectively, propellers 14, 15, 16. It is to be noted that the path of rotation of each propeller is below the upper face of the wing airfoil.

The outboard motors 12, 13 are carried by nacelles 17, 18, respectively, and these nacelles are mounted so that they may be positioned with their longitudinal axes directed forwardly and outwardly with respect to the longitudinal axis of the aircraft. Though the nacelles 17, 18 may be permanently mounted at an angle, as just mentioned, it is preferable that they be adjustably mounted on pivots so that the motors can be adjusted to bring the turning axes of the propellers of the outboard motors either parallel to or at various angles to the longitudinal axis of the aircraft. The pivotal mounting of the nacelles may be of any suitable construction and, in this instance, is as follows:

Referring more particularly to Figures 4, 5 and 6, the frame of one of the nacelles is indicated at 19 and it is to be understood that the frames of the nacelles are of like construction as are also the pivotal mountings. Accordingly, only one of the nacelle frames and its pivotal mounting need be described in detail.

There is nothing unusual about the nacelle frame 19 excepting that it is provided with inwardly extending struts 20 supported by pivot bearings 21, there preferably being two such bearings in vertical alinement. A support 22 is provided for the bearing 21. The bearing support 22 is carried by struts 23, 24, 25, the strut 23 being secured to the wing airfoil structure, and the struts 24, 25 being secured to the fuselage. Passing through the pivot bearings 21 and through flanges 26 of the bearing support 22 are pivot pins 27. The spaced pivot construction is desirable to properly resist the torque of the motor, which is bolted or otherwise secured to the nacelle forward end ring 271.

There is provided a means for adjustably securing the nacelle frames against swinging horizontally on their pivots and this means is constructed, in this instance, as follows:

The rear end of each nacelle frame 19 is provided with spaced ears 28 between which is horizontally positioned one of the flanges of an angle member 29 which is supported on the outer end of a member 30 which projects laterally from the fuselage. The member 29 is provided with a series of holes 31 which are adapted to be selectively engaged by a bolt 32 that passes through the ears 28. The series of holes 31 lies in a curved path and the center of radius of said path is the axis of the pivot pins 27.

The invention operates as follows:

Assuming that the nacelles 17, 18 are angularly adjusted so that the turning axes of the propellers extend forwardly and outwardly, as in Figure 2, and assuming, for example, that, during flight of the aircraft, the motor 12 accidentally stops, or is purposely stopped, thus stopping the propeller 15, and that the propeller 16 is being operated by the motor 13, it will be seen that the airship will be maintained in a straight course, when the rudder is set for straight ahead, for the reason that the slipstream from the operating propeller 16 flows rearwardly and inwardly against the adjacent sides of the fuselage, vertical fin and rudder airfoil. This slipstream tends to thrust the rear end of the aircraft to the right and this tendency is exactly counteracted by the tendency of the revolving propeller 16 to advance the left side of the aircraft faster than the right side. Thus, if one of the outboard motors should accidentally stop or be purposely stopped for repairs, repairs to the same may be readily effected while the aircraft is being flown by the operation of its other motor or motors and, while the repairs are being effected or flight is being made to a safe landing place, flying with the power unbalanced in this manner is much safer than if the turning axis of the outboard operating propeller were parallel to the longitudinal axis of the aircraft and only one of the outboard propellers were operating, as would be the case with prior known aircraft powered with a plurality of outboard motors.

The slipstream from each of the propellers flows only beneath the wing airfoil, thus avoiding reducing the degree of partial vacuum created above the wing airfoil by progression of said airfoil through the air.

A further advantage of positioning the propellers of the outboard motors so that the slipstreams are directed inwardly and rearwardly against the sides of the rudder, is that turning by use of the rudder is facilitated since the increased air pressure against the rudder airfoil makes the aircraft more sensitive to the rudder.

I claim:

1. An aircraft comprising a wing airfoil, a fuselage connected with the wing airfoil, a rudder airfoil adjustably connected with the fuselage, nacelles pivotally connected with the wing airfoil on opposite sides of the fuselage and independently adjustable to different angular positions in a horizontal plane, means to independently secure the nacelles in the positions to which they are adjusted, motors mounted on the nacelles, propellers mounted on and operated by said motors, and a vertical fin connected with the fuselage and extending along the center line thereof to receive the thrust of the rearwardly and inwardly flowing slip stream from one of the propellers when the motor driving the other propeller is inactive.

2. An aircraft comprising a wing airfoil, a fuselage connected with the wing airfoil, bearing supports, struts connecting the bearing supports with the wing airfoil, other struts connecting the bearing supports with the fuselage, bearings carried by the bearing supports, nacelles supported by the bearings, a means to releasably secure each of the nacelles in different positions relative to its associated bearing support, a motor mounted on each nacelle, and a propeller carried and operated by each motor.

3. An aircraft comprising a wing airfoil, a fuselage connected with the wing airfoil, bearing supports, struts connecting the bearing supports with the wing airfoil, other struts connecting the bearing supports with the fuselage, vertically positioned bearings carried by the bearing supports, nacelles supported by the bearings to swing horizontally into different positions, a means to releasably secure each of the nacelles in the different positions, a motor mounted on each nacelle, and a propeller carried and operated by each motor.

4. An aircraft comprising a wing airfoil, a fuselage connected with the wing airfoil, bearing supports, struts connecting the bearing supports with the wing airfoil, other struts connecting the bearing supports with the fuselage, bearings carried by the bearing supports, nacelles provided with inwardly extending struts supported by the bearings, a means to releasably secure each of the nacelles in different positions relative to its associated bearing support, a motor mounted on each nacelle, and a propeller carried and operated by each motor.

Signed at Los Angeles, California, this 8th day of December, 1928.

ALBIN K. PETERSON.